United States Patent [19]
Tilp

[11] 3,725,641
[45] Apr. 3, 1973

[54] ELECTRIC CUP HEATER

[75] Inventor: George E. Tilp, Short Hills, N.J.

[73] Assignee: Adams Industries, Union, N.J.

[22] Filed: Aug. 13, 1971

[21] Appl. No.: 171,559

[52] U.S. Cl. .................219/433, 219/430, 219/436, 219/439, 219/462, 219/530
[51] Int. Cl. ..............................................F27d 11/02
[58] Field of Search......219/429, 430, 433, 436, 438, 219/439, 458, 460, 462, 530, 540

[56] References Cited

UNITED STATES PATENTS

| 1,096,928 | 5/1914 | Kuhn | 219/462 X |
| 1,047,088 | 12/1912 | Kuhn | 219/433 |
| 3,585,362 | 6/1971 | Hoogesteger | 219/437 |
| 2,687,469 | 8/1954 | Koci | 219/433 X |
| 1,170,169 | 2/1916 | Kuhn et al. | 219/433 X |
| 1,659,986 | 2/1928 | Baughman et al. | 219/459 |
| 2,424,161 | 7/1947 | Gunther | 219/433 |
| 2,892,066 | 6/1959 | Springer | 219/433 X |
| 3,384,195 | 5/1968 | Jepson et al. | 219/438 X |
| 3,519,798 | 7/1970 | Walthner | 219/439 |
| 3,581,144 | 5/1971 | Beggs | 219/462 X |

FOREIGN PATENTS OR APPLICATIONS

| 894,130 | 4/1962 | Great Britain | 219/438 |
| 134,891 | 3/1952 | Sweden | 219/438 |

Primary Examiner—Volodymyr Y. Mayewsky
Attorney—Harry B. Rook

[57] ABSTRACT

A metal cup to contain liquid to be heated has a heat distribution plate spot welded or brazed to the exterior of the cup bottom wall and said plate has a perimetral depending flange within which is brazed a heater coil and which has circumferentially spaced extensions providing legs for supporting the cup in an insulated cup-shaped housing, providing simplicity of construction, ease of assembly and economical heat transfer from coil to cup.

1 Claim, 3 Drawing Figures

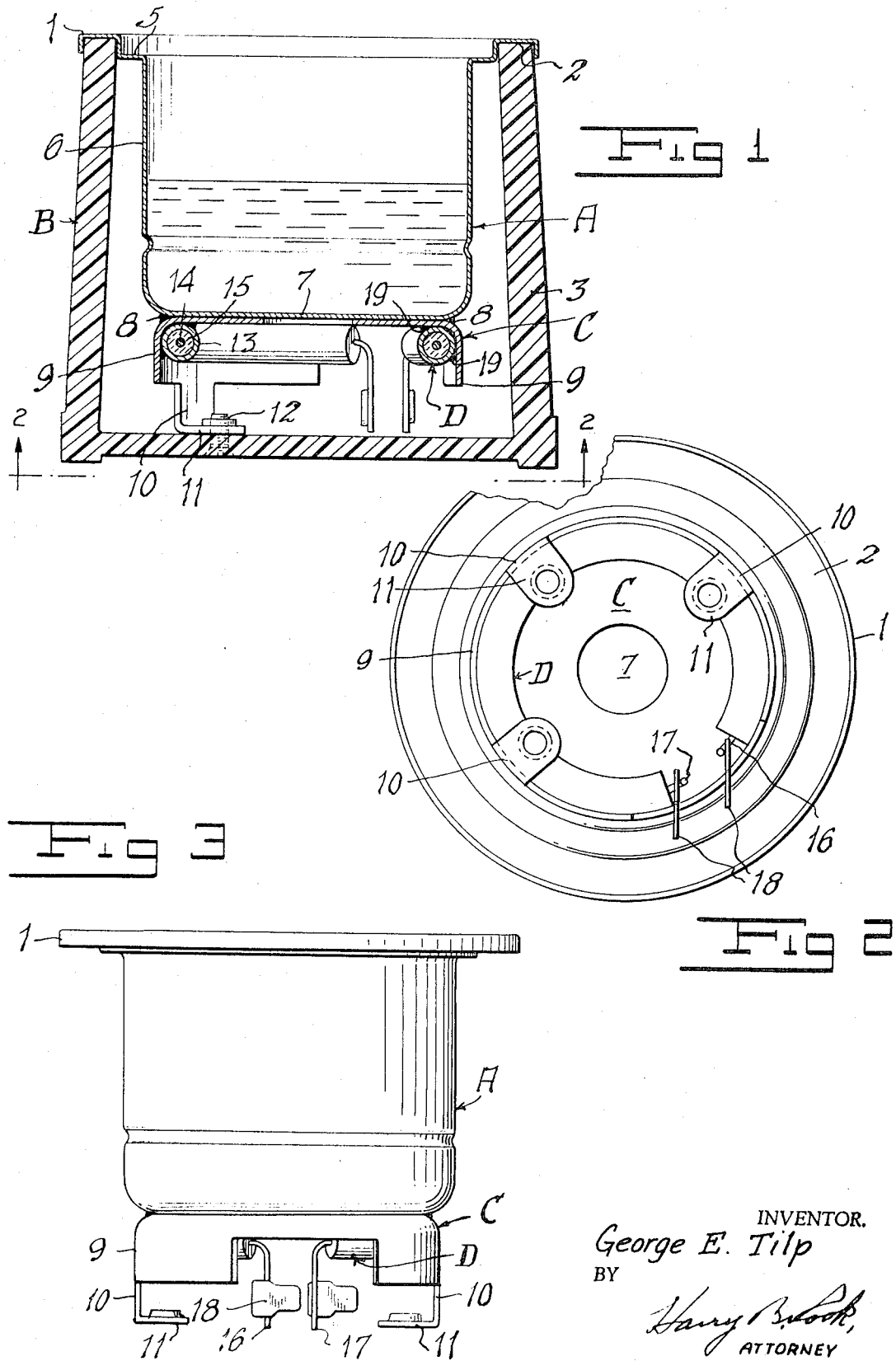

ELECTRIC CUP HEATER

BACKGROUND OF THE INVENTION

1. Field of the Invention

This invention relates to electric heaters of the type including a cup-like liquid container mounted in an insulated housing and having an electric heating coil associated therewith.

2. The Prior Art

The prior art devices leave much to be desired in that either they are complicated in construction, or are expensive, or are difficult to assemble, or have low heating efficiency.

SUMMARY

A primary object of the present invention is to provide a cup heater which overcomes the objections to or disadvantages of the prior art devices, and which is simple in construction, easy to assemble and has a relatively high heating efficiency.

Another object is to provide a novel and improved combination of a metal cup, a combined heat distribution and cup mounting plate directly secured to the cup and having legs for mounting the cup and plate in a housing, and a heating coil directly secured to said plate.

BRIEF DESCRIPTION OF THE DRAWINGS

FIG. 1 is a central vertical sectional view through a cup heater embodying the invention and assembled in an insulating housing;

FIG. 2 is a bottom plan view of the heater from the plane of the line 2—2 of FIG. 1, and FIG. 3 is a side elevational view of the cup heater removed from the housing.

DESCRIPTION OF THE PREFERRED EMBODIMENTS

Specifically describing the invention, the reference character A designates a cup preferably formed of stainless steel and preferably having a perimetral flange 1 providing a downwardly facing circular groove or channel 2 to receive the upper edge of an insulating housing B which is shown as having an approximately cylindrical side wall 3 and a bottom wall 4. Inwardly of the flange the cup also has a circular rabbett 5 which may provide a seat for a removable cover.

The side wall 6 of the cup is shown as approximately cylindrical while the bottom wall 7 is flat, although the cup may be otherwise shaped if desired.

In accordance with the invention a combined heat-distributing and cup-mounting plate C is directly secured to the outside of the bottom wall 7 of the cup, for example as by brazing indicated by the reference character 8. This plate is preferably formed of relatively heavy steel and has a depending circumferential flange 9 from which extend in circumferentially spaced relation, a plurality of supporting legs 10 each of which has an angularly disposed foot 11 to seat on a flat support such as the inside of the bottom wall 4 of the housing, the foot being secured to the support or wall by suitable fastening elements such as the bolts 12.

Also in accordance with the invention, an electric heater coil D is directly secured to the plate C and within the depending flange 9. Preferably the heater is arcuate in plan and is of a known type including a metal casing 13 surrounding a heating wire 14 and insulated therefrom by ceramic-like material 15. The ends 16 and 17 of the wire project beyond the ends of the casing for connection in an electrical circuit as by terminal connectors 18 of known construction. It is desirable that the steel casing of the heater be secured directly to the heat-distributing plate by brazing as indicated at 19.

From the foregoing it will be seen that the invention provides a simple construction which is easy to assemble and has a relatively high heating efficiency due to the heat distributing and mounting plate secured directly to the bottom wall of the cup, and the heater coil secured directly to the heat distributing plate beneath the cup.

The assembly of the cup, heat distributing plate and heater may be mounted on any suitable support and will be firmly held in the desired position by the bolts passing through the feet 11 into or through the support. Any desired number of legs and feet may be provided, but generally three, as shown, are adequate. Other types of heaters also may be utilized but the arcuate heater within the circular perimetral flange is especially efficient.

It will be understood by those skilled in the art that heaters of different wattages may be used, depending upon the circumstances, but for ordinary purposes a coil with a 100-watt rating is desirable.

I claim:

1. A cup heater comprising a metal cup having a side wall, a bottom wall and an open top for containing a substance to be heated, a metal plate brazed directly on the underside of the bottom wall of the cup in heat transferring contact therewith and having a perimetral depending flange from which depends perimetrally spaced integral legs for mounting the cup, and an electric heater including a metal casing, a heating wire therein and electrical insulating material between said heating wire and said casing, said heater having its metal casing brazed directly on said plate in heat transferring contact with the plate and the inner surface of said flange, said cup, said plate and said electric heater being disposed in an insulating housing, said housing having a side wall, a bottom wall and an open top, the open tops of said housing and said cup are connected by a peripheral flange, and said mounting legs are fastened to the bottom wall of said housing.

\* \* \* \* \*